Figure 1:
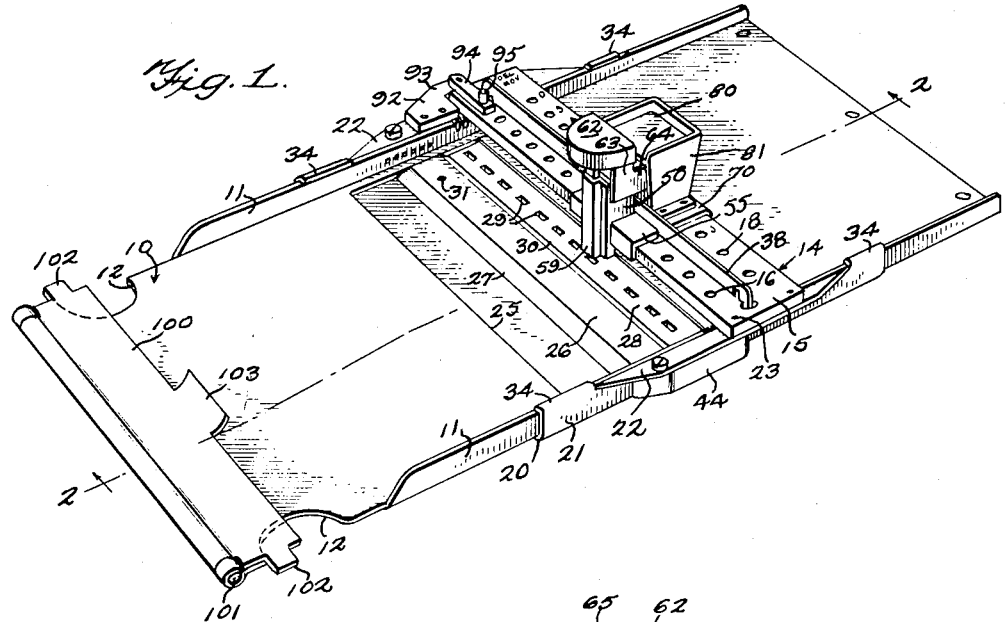

July 31, 1956

M. O. JONES 2,756,822

CARD PERFORATING DEVICE EMPLOYING A PUNCH MOVABLE
LATERALLY AND LONGITUDINALLY OF THE CARD

Filed March 10, 1952

2 Sheets-Sheet 1

INVENTOR
MONTGOMERY OSBORNE JONES

BY John F. Phillips

ATTORNEY

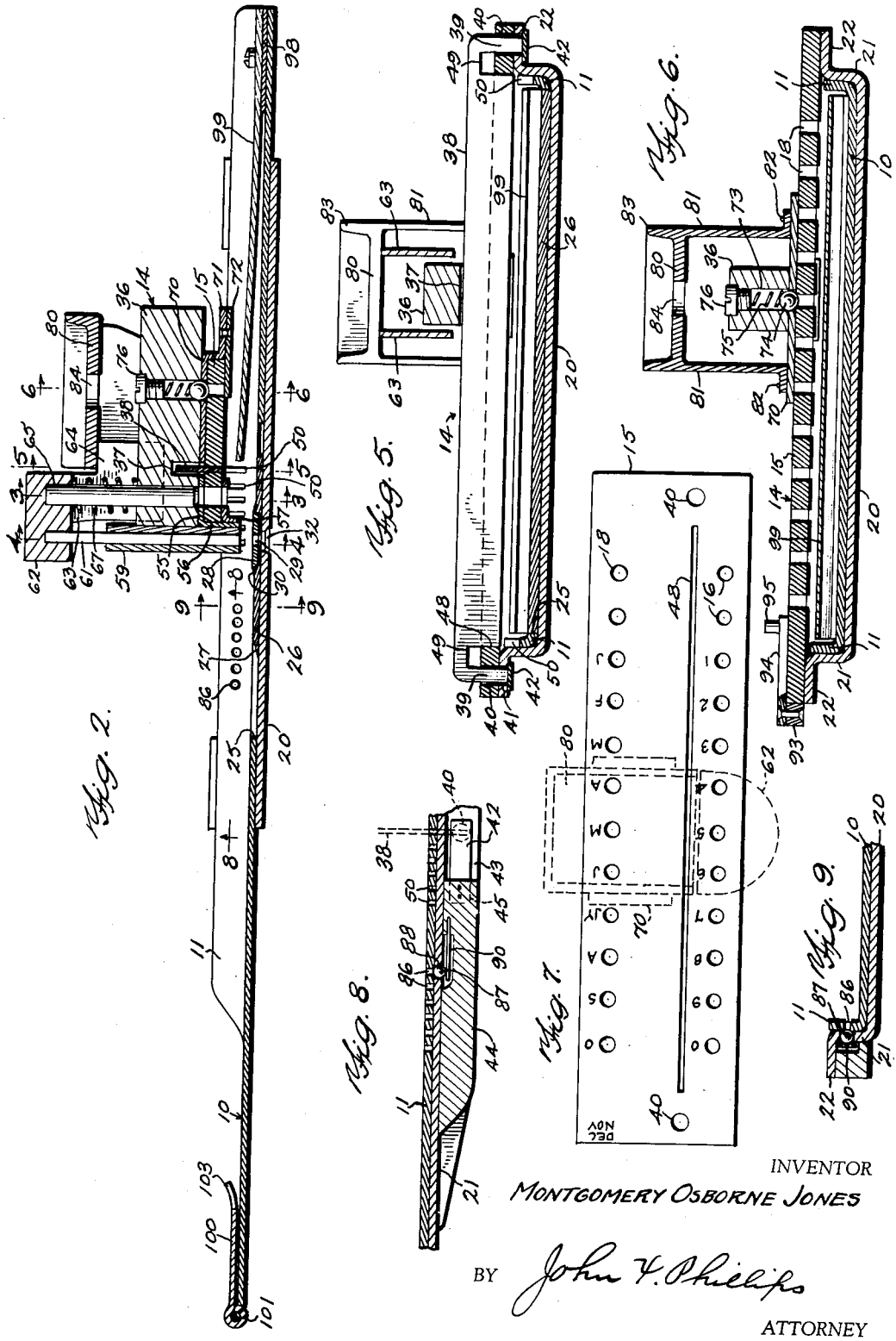

United States Patent Office 2,756,822
Patented July 31, 1956

2,756,822

CARD PERFORATING DEVICE EMPLOYING A PUNCH MOVABLE LATERALLY AND LONGITUDINALLY OF THE CARD

Montgomery O. Jones, Richmond, Va., assignor to G. Tucker Smith, Coleman Wortham, Jr., and Fielding L. Williams, Richmond, Va., trustees Application March 10, 1952, Serial No. 275,721

5 Claims. (Cl. 164—86)

This invention relates to a card perforating device, and more particularly to such a device for perforating cards used with automatic business machines.

Many large business organizations make use of business machines for bookkeeping and various other record keeping purposes, and such machines are operative in conjunction with card punched at predetermined points and passed through the machines for the automatic recording of data corresponding to the manner in which the card is punched. The use of these automatic business machines is highly practicable, as is well known, but they require the use of costly and bulky machines for perforating the cards. Accordingly, there are many fields in which systems of this character could be used but wherein their use is impracticable for the lack of a small portable card perforator.

One business system in which record keeping of this character would be highly desirable is in the issuance and recording of postal money orders. In recent years, the old-fashioned soft paper money orders have been discarded in favor of business machine cards to facilitate the work of the Post Office Department. However, it still has been necessary for each office issuing money orders to fill in these cards, including the filling in of the amounts of the money orders. This data had to be taken from the cards by Post Office workers, and much time and expense has been involved therein.

In my copending application, Serial No. 165,199, filed May 31, 1950, I have disclosed and claimed a card perforating device primarily intended for use in perforating cards to be used as insurance premium receipts, the suitably punched cards being forwarded to the insurance home office to be recorded by the business machines. Such device is adapted for use also in the punching of money order cards, but the present device represents substantial improvements over any prior device and is particularly intended to be used in punching money orders, while not necessarily restricted to such use.

An important object of the present invention is to provide a novel portable card perforating device providing a highly improved degree of visibility to facilitate the accurate punching of a card.

A further object is to provide a card punching device which is portable and easily operable and which employs a punch movable laterally and longitudinally of the card to desired punching positions and wherein the punch device has means associated therewith for facilitating movement of the punch over the card.

A further object is to provide a device of this character having detents operable for positioning the punch longitudinally and transversely of the card over the desired predetermined points at which it may be necessary to perforate the card, and to provide means operable upon actuation of the punch to positively lock the latter against movement longitudinally of the card, thus preventing the operator, when pressing the punch, from causing the punch to creep longitudinally of the card beyond the exact point which it is desired to perforate.

A further object is to provide such a locking means which automatically comes into operation upon initial actuation of the punch and before the punching operation is started, and which locking means prevents creeping of the punch longitudinally of the card regardless of the position of the punch transversely of the card.

A further object is to provide novel means for supporting for longitudinal movement along the body of the device a crosshead structure which carries the punch and die means.

A further object is to provide novel means for facilitating the positioning of the punch with respect to the desired points to be perforated and to limit movement of the punch transversely of the crosshead under certain conditions.

Other objects and advantages of the present invention will become apparent during the course of the following description.

Figure 3:
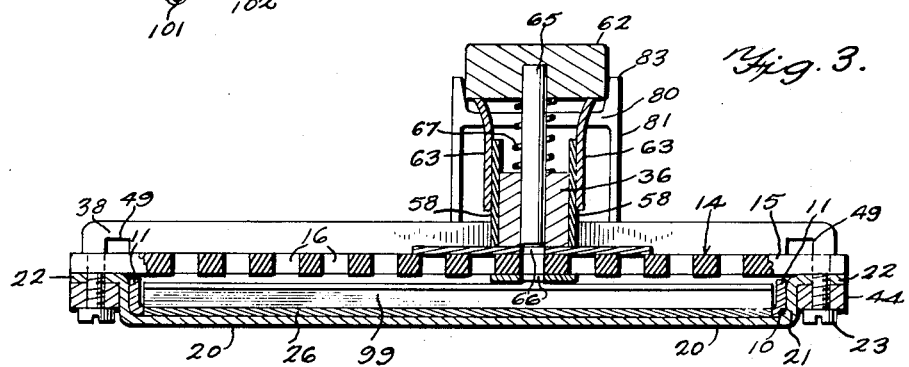
Figure 4:
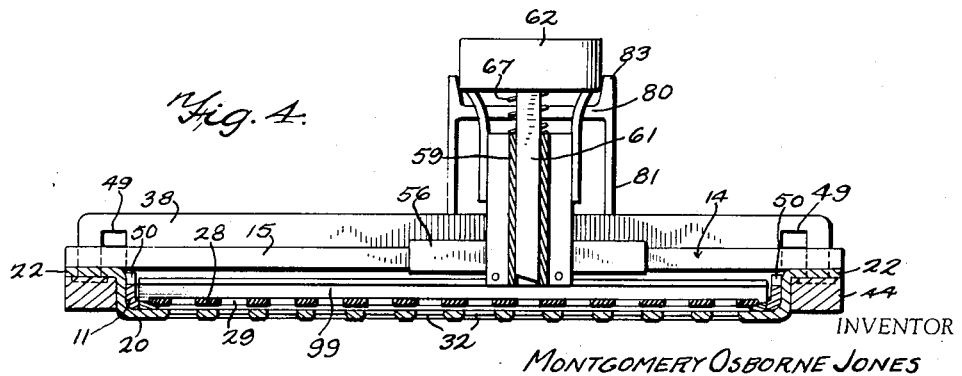

In the drawings, I have shown one embodiment of the invention. In this showing,

Figure 1 is a perspective view of the device,

Figure 2 is a longitudinal sectional view taken substantially on line 2—2 of Figure 1 and passing through the punch element, parts being shown in elevation, Figure 3 is a transverse vertical sectional view on line 3—3 of Figure 2, Figure 4 is a similar view on line 4—4 of Figure 2, Figure 5 is a similar view on line 5—5 of Figure 2, Figure 6 is a similar view on line 6—6 of Figure 2, Figure 7 is a plan view of the body plate of the carriage, the punch operating button and associated elements being shown in dotted lines, Figure 8 is a fragmentary sectional view taken in the plane indicated by the line 8—8 of Figure 2 and extending further to the right in Figure 2 to show the locking notches, and Figure 9 is a fragmentary sectional view on line 9—9 of Figure 2.

Referring to the drawings, the numeral 10 designates the body of the device as a whole formed of relatively rigid sheet material and generally rectangular in shape. Opposite edge portions of the body 10 throughout the greater portion of the length thereof are turned upwardly to form stiffening and guiding flanges 11. At one end, and preferably in both edges thereof, the body 10 is notched as at 12 to facilitate the picking up of punched cards from the device, as will become apparent.

A traveling structure or crosshead indicated as a whole by the numeral 14 is mounted to slide longitudinally of the body 10. This structure comprises a relatively heavy body plate 15 extending transversely of and beyond the body 10 and flanges 11 as clearly shown in Figures 1 and 6. The plate 15 is provided with a series of openings 16 engageable with a locking pin referred to below. These openings and the associated locking pin operate to lock the punch to be described against movement laterally of the card to be punched after the punching operation has been started. This feature forms no part of the present invention but is desribed in the copending application of Montgomery Osborne Jones and Raymond S. Ruffin, Serial No. 275,722, filed March 10, 1952, now Patent No. 2,684,717.

The body plate is further provided with a plurality of openings 18 (Figures 1 and 6) engageable by detent means to be described to position the punch transversely of the card.

The traveling structure 14 further comprises a generally rectangular bottom plate 20 slidable over the bottom surface of the body 10 and being turned upwardly at its edge portions as at 21 to form flanges slidable against the flanges 11 outwardly thereof. The longitudinal edge portions of the plate 20 terminate in horizontal flanges 22 to which the body plate 15 is secured by any suitable attaching means such as screws 23. The body plate 15 and bottom plate 20 accordingly slide as a unit longitudinally of the plate 10, and together they form a structure which extends entirely around the body 10 transversely thereof.

The body 10 is provided intermediate its ends with a rectangular opening 25, the length of which, longitudinally of the body 10, will be determined by the particular nature of the card with which the device is to be used. Within the opening 25 is arranged a plate 26, the forward or left hand end of which, as viewed in Figures 1 and 2, is tapered downwardly as at 27 to a very thin edge. This is to facilitate the sliding of a card into position, as will become apparent.

The plate 26 carries a relatively thin die plate 28 having die openings 29 therethrough which are preferably rectangular in shape in accordance with business machine practice. The die plate is preferably set into the plate 26 and brazed thereto as at 30. The plate 26 is fixed in any suitable manner to the bottom plate 20 to move therewith, for example by flush rivets 31 (Figure 1). The bottom plate 20 is apertured as at 32 beneath the respective die openings 29 (Figure 4). The present device is particularly intended for perforating money order cards which bear six perforable columns, and the plate 26 accordingly need have only sufficient movement in the opening 25 longitudinally of the body 10 to encompass such six columns which are further referred to below.

The flanges 22 (Figure 1) terminate inwardly of the ends of the plate 20 and the latter has its flange portions 21, beyond the flanges 22, turned inwardly over the top edges of the flanges 11 as at 34. Four turned-in flanges are thus provided as shown in Figure 1 to provide rectangularly arranged guide means between the carriage and the body 10, thus eliminating any undesirable play in the movement of the parts.

Above the body plate 15 and extending transversely thereof is a block 36 grooved in its underface as at 37 to receive a lock bar 38 (Figures 1 and 5). This lock bar is preferably formed of strip steel and has at its ends depending fingers 39 extending through openings 40 in the bar or plate 15 and through similar openings 41 in the flanges 22. The lower ends of these fingers engage leaf springs 42 arranged in recesses 43 in longitudinal blocks 44 fixed to the flanges 22. One end of each leaf spring 42, as indicated in dotted lines in Figure 8, is set into a recess 45 in the associated block 44 or is secured to such block in any suitable manner. The leaf springs 42 bias the locking bar 38 to the normal position shown in Figure 5.

Inwardly of the openings 40, the plate 15 is provided with an elongated slot 48 through which the greater portion of the length of the locking bar 38 projects as shown in Figure 5, the lower edge of the locking bar being notched near each end as at 49 to bridge over the portions of the plate 15 between the openings 40 and slot 48. The bottom edge of the main portion of the locking bar, when in normal position as in Figure 5, is substantially flush with the bottom face of the plate 15.

Just inwardly of the ends of the slot 48, the lower edge of the lock bar adjacent opposite ends thereof is selectively engageable in notches 50 cut into the upper edges of the body flanges 11. Two of these notches show adjacent the remote end of the plate 15 in Figure 1. All of these notches show in Figure 2, and one at each side will be seen in Figures 4 and 5. It will become apparent that the notches 50, engaging the locking bar 38, fix the carriage 14 against movement longitudinally of the plate 10 upon actuation of the punch to be described.

A plate 55 overlies the plate 15 forwardly of the slot 48 and has its forward edge turned downwardly as at 56 and connected to the similar portion of a lower plate 57 fixed beneath the plate 15. The plate 55 has upstanding flanges 58 secured against opposite faces of the block 36, and to these flanges is fixed a vertical guide 59 in which is arranged a punch 61 having its lower end inclined as shown in Figure 4 to facilitate the perforating of the cards. The punch 61 corresponds in cross sectional shape to the die openings 29.

A finger piece 62 is mounted on the upper end of the punch and is provided with a pair of depending flanges 63 slidable over the flanges 58. The flanges 63 are provided with rearwardly extending portions 64 for a purpose to be described.

Rearwardly of the punch 61, the finger piece 62 carries a depending pin 65 slidable through selected openings 16 (Figure 3) and the plates 55 and 57 are apertured as at 66 for the movement of the pin 65 downwardly through one of the openings 16 when the finger piece 62 is depressed. A compression spring 67 (Figures 2 and 3) surrounds the pin 65 between the block 36 and finger piece 62 to urge the latter upwardly together with the punch 61.

A plate 70 (Figures 2 and 6) is slidable on the top face of the plate 15 rearwardly of the slot 48 and the block 36 is fixed to the plates 55 and 70. The plate 70 has a rear depressed end 71 fixed to a lower plate 72 projecting forwardly beneath the plate 15. The plates 55 and 57 and the plates 70 and 71 slidably mount the block 36 and the elements carried thereby with respect to the plate 15.

The block 36 and plate 70 are provided with a continuous opening 73 in the bottom of which is mounted a ball detent 74 urged downwardly by a spring 75 held in position by a screw 76. The ball 77 snaps into selected openings 18 to position the punch 61 with relation to any row of numbers or other indicia on the card.

A thumb seat 80 is arranged above the block 36 and is provided with depending sides 81 seating upon and fixed to the plate 70 as at 82 (Figure 6). The seat 80 is provided with an upstanding flange 83 on three sides, as clearly shown in Figure 1 to facilitate movement of the punch and associated elements transversely and longitudinally of the plate. At the side across which the flange 83 does not project is arranged the finger piece 62 which projects above the seat 80 to be engaged by the thumb of the user to be pushed toward the left as veiwed in Figure 2. The rearwardly projecting flanges 64 engage against the bottom of the seat 80 to limit upward movement of the punch and the elements connected thereto. The seat 80 is apertured as at 84 for the insertion of the screw 76, as will be apparent in Figure 2.

Detent means is also provided for positioning the punch relative to successive columns of indicia. To this end, it will be noted in Figures 1, 2 and 8 that the flange 11 is provided with openings 86 corresponding to the columns of indicia and a ball 87 projects through an opening 88 in each flange 21 to selectively engage the openings 86. A leaf spring 90 carried by each block 44 urges the ball 87 into position. It will be understood that this detent means is preferably employed at each side of the device.

As previously stated, the present device, while not restricted to such use, is particularly adapted for use in punching money order cards. Such cards are provided with a total of six columns, the first of which to the right of the card indicates the months of the year, and accordingly there are twelve die openings 29, and twelve sets of openings 16 and 18 in the plate 15. The next five columns on the card are numerals indicating dollars and cents, these numerals, of course, running from "0" to "9," and accordingly there are ten rows of numerals.

At the present time, money orders can be made out to a maximum amount of $199.99, and accordingdly the top row of numerals on the card is made up of five "0's" and the next column is made up of five "1's," the remaining rows being made up of four numerals each from "2" to "9." To facilitate the use of the present device, the plate 15 is provided with the initials or abbreviations of months of the year as shown in Figure 7, the initial "J" for January preferably being arranged adjacent the third opening 18 from the right in Figure 7 and progressing through October at the last opening 18 at the left. This arrangement is provided so that the initials of the months can be read adjacent the left hand edge of the plate 70 as viewed in Figure 6, the punch being aligned with the first opening 16 when January is to be punched, and the initial "J" being exposed at the edge of the plate 70. Abbreviations for November and December appear at the left hand end of the plate 15, it being necessary to move the punch one or two notches beyond the visible initials of the months on the plate 15 for the last two months of the year.

The numerals for the number columns appear adjacent the openings 16 as shown in Figure 7, the numeral "1" appearing adjacent the third opening 16 from the right, and the numbers progressing up to "0." When the "0" is visible, the punch is actually opposite the number "8" on the plate 15 and accordingly the punch is capable of being moved two steps further because of the necessity of providing twelve punch positions for the months of the year. Means is provided for use during the first ten months of the year to prevent movement of the punch beyond the "0" point so that the operator need use less care in operating the device.

Referring to Figure 1, it will be noted that a block 92 is fixed to the flange 22 at the far side of the device as viewed in Figure 1. This block has a finger 93 projecting beyond the adjacent end of the plate 15 and a pivoted finger 94 is connected thereto and provided with an upstanding pin 95. For the first ten months of the year, the finger 94 may be arranged as shown in Figure 1, thus preventing movement of the punch beyond the proper "0" position. During the months of November and December, the free end of the finger 94 will be swung to the left in Figure 1 to overlie the block 92, thus rendering the punch free to move to positions in alignment with the eleventh and twelfth die openings 29 from the left as viewed in Figure 4.

The card to be punched will be of a width equal to the space between the flanges 11 to fit relatively accurately therebetween, and means are provided for positioning the card in the device longitudinally thereof and for facilitating the insertion and removal of the card. Referring to Figure 2, the numeral 98 designates a spacer plate secured against the body 10 at the right hand end thereof, and above this plate is arranged a guide plate 99, also fixed in position and projecting to a point in proximity to the locking bar 38. The free end of the plate 99 slopes or curves upwardly to a slight extent as shown in Figure 2. The card is inserted from the left hand end of the device and the plate 99 guides the card into position with its end engaging the left hand edge of the plate 98 in Figure 2.

At the left hand end of the device in Figures 1 and 2 is arranged a plate 100 pivoted as at 101 to the body 10. This plate may be provided at opposite edges with laterally projecting finger pieces 102 and it may be provided centrally of the length of its free edge with a projecting upturned lip 103 forming another finger piece. Either of these finger pieces conveniently may be engaged to swing the plate 100 outwardly for the insertion of the card, whereupon the plate 100 is swung downwardly to hold the card in position during the punching operation.

*Operation*

The card to be punched is inserted endwise into the device from the left hand end thereof in Figure 2 as stated above, the plate 100 being swung outwardly during such operation. The plate 99 guides the card into position, and when the advancing end of the card engages the plate 98, the plate 100 is then swung downwardly into position in contact with the top face of the card. The punching operations are now ready to be performed.

With the card in position, the operator will manipulate the carriage by placing his thumb in the thumb seat 80. The flanges on the back and sides of the thumb seat facilitate pulling the punch carriage to the right in Figure 1 and moving it transversely, while forward movement to the left is facilitated by pressure against the back of the finger piece 62. Assuming that the money order is issued in February, the operator will pull back on the thumb seat 80 to move it to the right to its limit of movement in Figure 2, at which point the right hand edge of the plate 26 will strike the rear limit of the opening 25. The column of months will then be exposed on the card and the operator will advance the punch carriage into alignment with the column of months. While holding the carriage in its right hand limit of movement, the operator may move the punch into alignment with the desired month, or he may move the carriage into alignment with the month column and then move the carriage laterally until "F" for February is exposed by the carriage adjacent the edge thereof. The operator will then press the finger piece 62 downwardly to punch the card at the desired point. This operation is repeated for the numerals in the number columns, and in the interest of care and accuracy, the operator preferably will pull back on the carriage after each punching operation and then advance it into alignment with the desired column and move the punch carriage transversely of the device to place the punch over the desired number.

The detent 87 (Figures 8 and 9) will properly position the carriage for each column on the card while the detent 74 (Figures 2 and 6) will position the carriage accurately for each row of indicia.

The detents are important in positioning the punch in the exact positions for the punching operations, as will be apparent. In depressing the finger piece 62, however, the operator may exert some degree of force horizontally so that the punch would tend to creep away from its intended accurate punching position. This would be a fatal defect since the card could not be used in automatic business machines. The possibility of such inaccurate operation can be overcome to some extent by making the detent springs relatively strong and seating the detent balls more deeply in their openings. This would not be a complete cure for the defect referred to and would render it considerably more difficult to move the carriage against the resistance of the detents and the springs. The present device employs light detent springs and shallow seating of the detents in their openings for accurate positioning of the punch and provides means for locking the carriage in position upon initial operation of the punch. This is particularly important in connection with movement of the crosshead longitudinally of the body since in shifting the thumb from the seat 80 to the finger piece 62, there is a tendency to push forwardly as well as downwardly. Referring to Figures 1, 2 and 5, it will be noted that the lower edges of the flanges 63 of the finger piece are arranged slightly above the top edge of the locking bar 38. This distance is slightly less than the distance between the lower end of the punch and the thin card over the die openings. When the punching operation is to be performed, therefore, depression of the punch causes the lower edges of the flanges 63 to engage the locking bar 38 and the edges of this bar adjacent the notches 50 will engage within these notches to lock the carriage against longitudinal movement. The springs 42 (Figure 5) urge the locking bar 38 upwardly, and either or both ends of the locking bar are movable downwardly against the light tension of the springs 42. Thus if the punch is operated adjacent one end of the plate 15, the corresponding end of the locking bar will be moved downwardly to lock the carriage, while in the central region of the plate 15, both ends of the locking bar will be depressed. Only one end need be moved downwardly to lock the carriage, and this device insures the punching of each opening at the desired point. The notches 50 correspond in position to the detent openings 86, as will be apparent. In the event a forward force is exerted on the finger piece 62 before the locking bar engages the proper notch or notches 50, the locking bar cannot be depressed and the punching operation cannot be performed. The locking bar thus permits the use of a light spring 90 (Figure 8) and shallow seating of the detent ball 87, thus permitting the crosshead to move relatively easily while the locking bar positively prevents the punching of a hole unless the punch is properly aligned with one of the die openings 29. Once the locking bar has engaged one or both of the notches 50, it is impossible to move the crosshead longitudinally of the device.

The locking pin 65 serves the same function transversely of the device. The pin 65, however, forms no part of the present invention and is disclosed and claimed in the copending application of Montgomery Osborne Jones and Raymond S. Ruffin, Serial No. 275,722, filed March 10, 1952, referred to above. It will be noted that the lower end of the pin 65, in the normal positions of the parts, is slightly above the top face of the plate 15 and when the finger piece 62 is depressed, the lower end of the pin 65 must enter one of the openings 16; otherwise the punch operation cannot be performed. Once the pin 65 enters the proper opening 16, the carriage cannot be moved transversely of the device. The locking devices referred to insure clean cutting in the perforating of the card and insure the accuracy of the positioning of the punch for each punching operation.

Particular attention also is invited to the fact that the punch is arranged in advance of the carriage, and referring to Figure 1, it will be apparent that each column of the card will be exposed to full view in any position of the punch, thus permitting the operator to easily visually select the proper column for the punching operation.

In punching money order cards, it is essential in preventing fraud that all five number columns be punched. For example, assuming that the money order is to issue for $25.49 and only these numerals were punched, an unscrupulous person might succeed in punching the numeral "1" in the hundreds column, thus raising the money order to $125.49. Thus for money orders of any amount less than $100.00, the column or columns to the left of the amount to be punched will have the "0's" thereof punched through the card. Thus for a money order of the amount referred to, the card will be punched to read "02549." If the amount is less than $10.00, then the "0" for each of the tens and hundreds columns will be punched. The proper operation of the present device, therefore, prevents fraud in the raising of the amounts of money orders. It also will be apparent that while the amount of the money order will be written in by the issuing clerk, the amounts also will be punched and the card can be passed directly through a business machine to be recorded without any loss of time incident to the taking off of the hand written amounts on the money orders.

I claim:

1. A card punching device comprising an elongated rectangular body, means carried by said body for positioning a card thereon to be punched, a traveling structure slidably connected to said body for movement longitudinally thereof, said body and said traveling structure having cooperating side flanges one of which is provided with a series of detent openings and the other of which is provided with a detent selectively engageable in said openings to position said traveling structure longitudinally of said body, a crosshead forming a part of said traveling structure and supported by a portion thereof for sliding movement transversely of said body, detent means for positioning said crosshead at selected points transversely of said body, a die plate carried by said traveling structure and provided with a plurality of die openings spaced transversely of said body, a vertically movable punch carried by said crosshead and arranged over one of said die openings in each selected position of said crosshead transversely of said body, each side flange of said body being provided with upwardly opening notches spaced apart corresponding to said detent openings, a transverse locking bar carried by said traveling structure, said locking bar being vertically movable and being biased to a normal upper position in which lower edge portions thereof are arranged above the flanges of said body, and means vertically movable with said punch and directly engageable with said locking bar in any selected position of said crosshead transversely of said body for effecting downward movement of at least one end of said locking bar to cause it to engage with a selected notch.

2. A card punching device comprising a body for supporting a card, and a traveling structure slidably connected with said body for linear movement relative thereto, said traveling structure comprising a cross member above said body and a bottom plate beneath said body connected at its ends to said cross member whereby said cross member and said bottom plate comprise a unit completely surrounding said body transversely thereof, said bottom plate having an opening, a die plate arranged in said opening, a punch structure mounted for linear movement along said cross member substantially perpendicular to the linear movement of said traveling structure relative to said body, said punch structure comprising a punch element and guide means therefor arranged wholly beyond one edge of said cross member and projecting downwardly therefrom to be fully visible in any position of said punch structure or said traveling structure, said die plate having a plurality of die openings alined parallel to said linear movement of said cross member and in the vertical plane of said punch element for selectively receiving the latter in a card-punching operation, said punch element having a finger piece at its upper end operable for moving said punch element axially, and a thumb seat fixed to said punch structure and projecting from said finger piece toward the opposite edge of said cross member, said thumb seat being arranged lower than the top of said finger piece and having upstanding flanges around a plurality of sides thereof.

3. A device constructed in accordance with claim 2 provided with means for biasing said punch element upwardly, and means fixed with respect to said finger piece and projecting beneath said thumb seat to engage the latter and limit upward movement of said punch element.

4. A card punching device comprising an elongated rectangular body, and a traveling structure slidable longitudinally of said body, said traveling structure comprising a cross member extending across the top and beyond the longitudinal edges of said body, a bottom plate extending across and beyond the bottom of said body and fixed at its ends to said cross member whereby said cross member and said bottom plate form a rigid unit surrounding said body transversely thereof, said cross member having a slot therethrough extending transversely of said body throughout the width thereof, a locking bar mounted in said slot for vertical movement therein and biased upwardly, the longitudinal edges of said body having upturned flanges provided with spaced notches engageable by end portions of said locking bar in selected positions of said traveling structure longitudinally of said body, a punch structure slidably mounted on said cross member for movement transversely of said body; said punch structure comprising a punch element arranged beyond one edge of said cross member and having means for guiding it for vertical movement, detent means between said traveling structure and said body for positioning said punch element over selected columns of indicia on a card arranged beneath said punch element and for positioning said locking member above selected notches in said flanges, and means movable with said punch element and engageable with the top edge of said locking member for moving the latter downwardly to engage it with at least one of said notches upon initial downward movement of said punch element.

5. A device constructed in accordance with claim 4 provided with detent means operative between said punch structure and said cross member for positioning said punch element over any row of indicia on the card.

References Cited in the file of this patent

UNITED STATES PATENTS

| | | |
|---|---|---|
| 487,737 | Hollerith | Dec. 13, 1892 |
| 912,142 | Livermore | Feb. 9, 1909 |
| 1,005,562 | Lease | Oct. 10, 1911 |
| 1,203,262 | Powers | Oct. 31, 1916 |
| 1,742,216 | Rauber | Jan. 7, 1930 |
| 1,904,719 | Beaumarchais | Apr. 18, 1933 |
| 2,027,524 | Fankboner | Jan. 14, 1936 |
| 2,580,756 | Furman | Jan. 1, 1952 |